United States Patent

Faure et al.

[11] Patent Number: 6,006,897
[45] Date of Patent: Dec. 28, 1999

[54] CLOSED CIRCUIT SWITCHING MACHINE, ON A VERTICAL PLANE, WITH DEVICES TO MAINTAIN THE ARTICLES' TRANSPORT PLANES IN AN ESSENTIALLY HORIZONTAL POSITION

[75] Inventors: Andrea Faure, Genoa Sanpierdarena; Nedo Gennari, Genoa, both of Italy

[73] Assignee: Finmeccanica S.p.A., Rome, Italy

[21] Appl. No.: 09/005,588

[22] Filed: Jan. 12, 1998

[30] Foreign Application Priority Data

Jan. 10, 1997 [IT] Italy .................................. MI97A0026

[51] Int. Cl.$^6$ ........................... B65G 17/16; B65G 17/48
[52] U.S. Cl. ........................................... 198/797; 198/800
[58] Field of Search ..................... 198/797, 800

[56] References Cited

U.S. PATENT DOCUMENTS

| | | | |
|---|---|---|---|
| 697,008 | 4/1902 | Palmer | 198/797 |
| 5,387,260 | 2/1995 | Gennari et al. | 198/800 |
| 5,642,604 | 7/1997 | Muller | 198/797 |

FOREIGN PATENT DOCUMENTS 0 611 709  8/1994  European Pat. Off. .

*Primary Examiner*—William E. Terrell
*Assistant Examiner*—Mark A. Deuble
*Attorney, Agent, or Firm*—Young & Thompson

[57] ABSTRACT

A switching machine having a number of trolleys pulled by belts mounted on drive wheels set at the ends of the machine and comprising a mechanism suitable for imposing a counter rotating motion on the trolleys, so as to maintain them in a correct position while passing over the drive wheels.

The mechanism for achieving the counter rotation motion on the trolleys comprises a number of first sprockets, mounted on a support firmly attached to the drive wheels, having a rotation motion proportional to the rotation of the drive wheels and having the same direction, and, for each trolley, a sprocket firmly attached to the frame of the trolley, suitable for meshing with said first sprockets when the trolley reaches the ends of its path.

3 Claims, 3 Drawing Sheets

CLOSED CIRCUIT SWITCHING MACHINE, ON A VERTICAL PLANE, WITH DEVICES TO MAINTAIN THE ARTICLES' TRANSPORT PLANES IN AN ESSENTIALLY HORIZONTAL POSITION

FIELD OF THE INVENTION

This invention offers a switching machine of a type comprising a number of transport planes, each constituted by a trolley with a tray, a rotating mat or similar, moving in a closed circuit and ranging over several levels, in particular over a ring-shaped path arranged in an essentially vertical plane.

BACKGROUND OF THE INVENTION

These trolleys are tied to belts, chains or similar devices pulling them along rails comprising two essentially horizontal superimposed sections, connected by two curved sections on which the trolleys move from the upper to the lower path and vice versa.

A transport plane rigidly fastened to chains would in this process be flipped over, with the consequent dropping off of the transported items.

In order to prevent this, certain devices need to be supplied to constantly maintain the transport planes in an essentially horizontal position, even when they pass the curved sections connecting the upper horizontal plane with the lower plane of the path.

Switching machines of this type are already known, and one of these is for example described in the Italian patent application no. MI93A 0309 by the same applicant. This known switching machine comprises several trolleys, each of which fitted with a rotating mat which constitutes the item's transporting and unloading plane.

The trolleys are hinged to a pair of chains pulled in a rotating motion along a vertical plane by sprockets. At the connecting points between the upper and the lower path, certain devices are supplied which keep the trolleys in a horizontal position while passing from one section of the path to another, thus preventing them from flipping over.

In particular, these devices consist of tongs mounted on discs coaxial with the chains' pulling wheels and moving in a synchronized fashion with the latter, engaging the mentioned trolleys so as to keep them in an essentially horizontal position while passing from an upper to a lower section of the course, and vice versa.

SUMMARY OF THE INVENTION

The present invention now fits into this section, by offering a switching machine of the type described above, equipped with simplified devices serving the purpose of imposing a counter-rotating motion on the trolleys, so as to maintain them in a proper position while moving over the drive wheels of the chains at the two extremities of the straight sections of the path.

These devices comprise a number of sprockets mounted on a disc firmly fastened to the pulling axis of the machine and engaged by a timing belt, which in turn engages another sprocket firmly mounted on the same disc shaft.

The frame of each switching machine trolley includes a shaft hinged at its ends to the pulling chains. A sprocket keyed on this shaft engages, whenever the trolley comes to position facing the joint between the upper and lower sections of the path, one of the sprockets mounted on the disc firmly attached to the drive shaft. These sprockets are rotated by engaging with the timed belt and therefore with the fixed wheel.

The rotation is transferred to the wheels mounted on the trolley shafts, forcing them to rotate in a manner compensating the rotation due to the turning of the chains around the pulling wheel, thus keeping the trolleys and the relative transport planes in a correct position.

BRIEF DESCRIPTION OF THE DRAWINGS

This feature, as well as other beneficial features of the invention, will be more clearly apparent in the following detailed description, supplied as a non-limiting example, by reference to the enclosed figures in which.

DESCRIPTION OF THE PREFERRED EMBODIMENT

Figure 1:
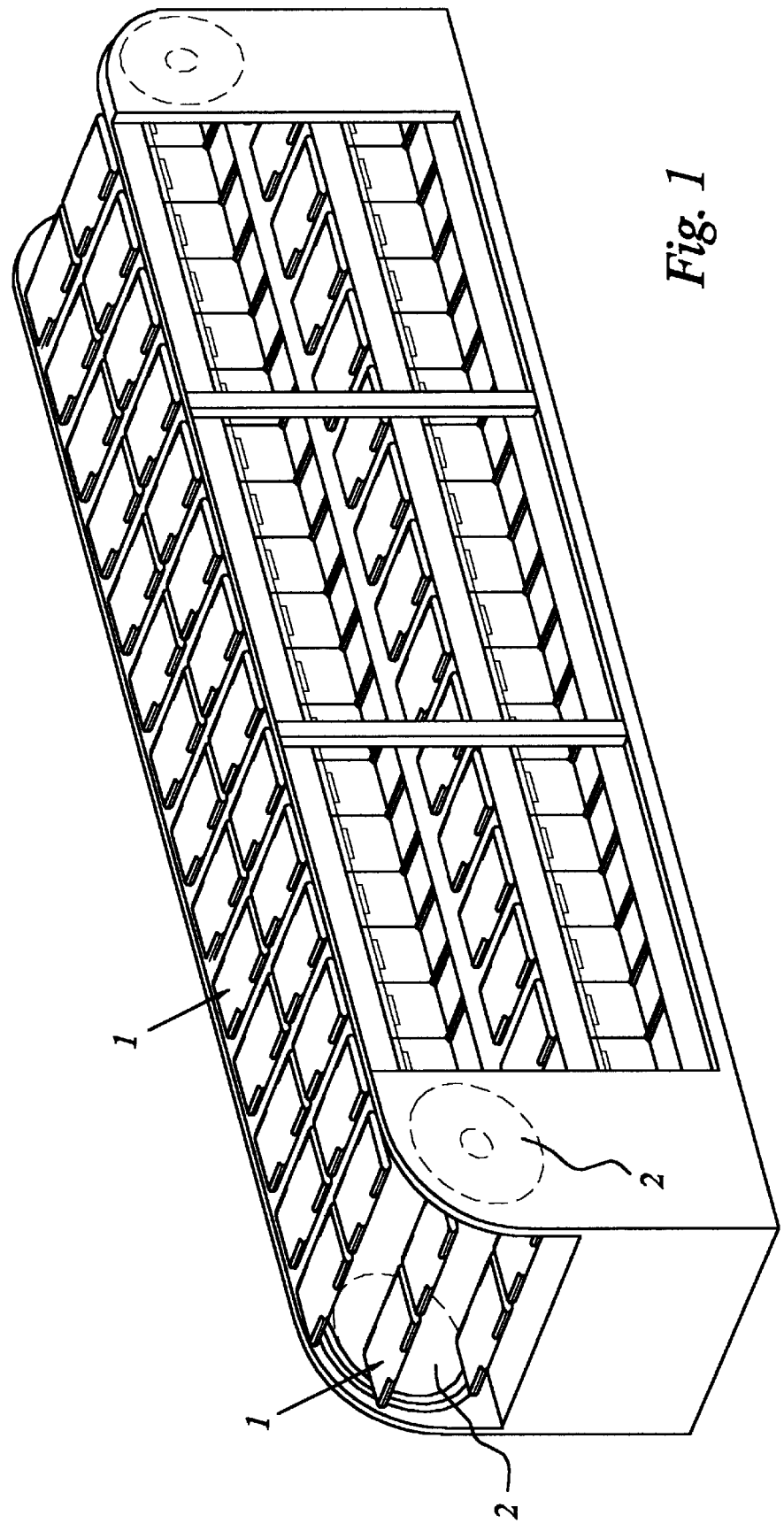
FIG. 1 shows an overall scheme of a switching machine according to the invention.

With reference to the FIG. 1, a switching machine according to the invention comprises a number of transport planes 1, constituted for example by a trolley mounting a rotating mat which forms the carrying plane and unloading device for the transported items, which are pair-wise linked to chains, pulling belts or similar elements mounted on wheels 2, at least one of which is connected to driving units of a known type.

The path therefore has a closed configuration and includes a straight upper section and a straight lower section, connected by curved sections at the point of the wheels 2.

Each end of the machine has one or more loading stations, not shown in the figure, in which the appropriately coded items are loaded onto the machine, while assigning a pre-established trolley to each item.

A number of collecting devices are arranged along the path, into which the trolleys unload their items.

All these functions are controlled by electronic devices known to the skilled man, so that their description is unnecessary.

Every transport plane 1 (FIG. 2) comprises a frame 3 solidly attached to a shaft 4 hinged at its ends to a pair of chains shown schematically and indicated by a number 5. At its ends the frame carries free-wheeling pairs of rollers 6 or similar, which run inside guides or rails 7 during the straight sections of the path.

These guides end at the head in the vicinity of the pulling wheels 2 moving the chains 5. Each of the wheels 2 is mounted on a shaft 8 also pulling a disc 9 along a rotating motion, whose perimeter carries a number of free-wheeling sprockets 10.

Figure 3:
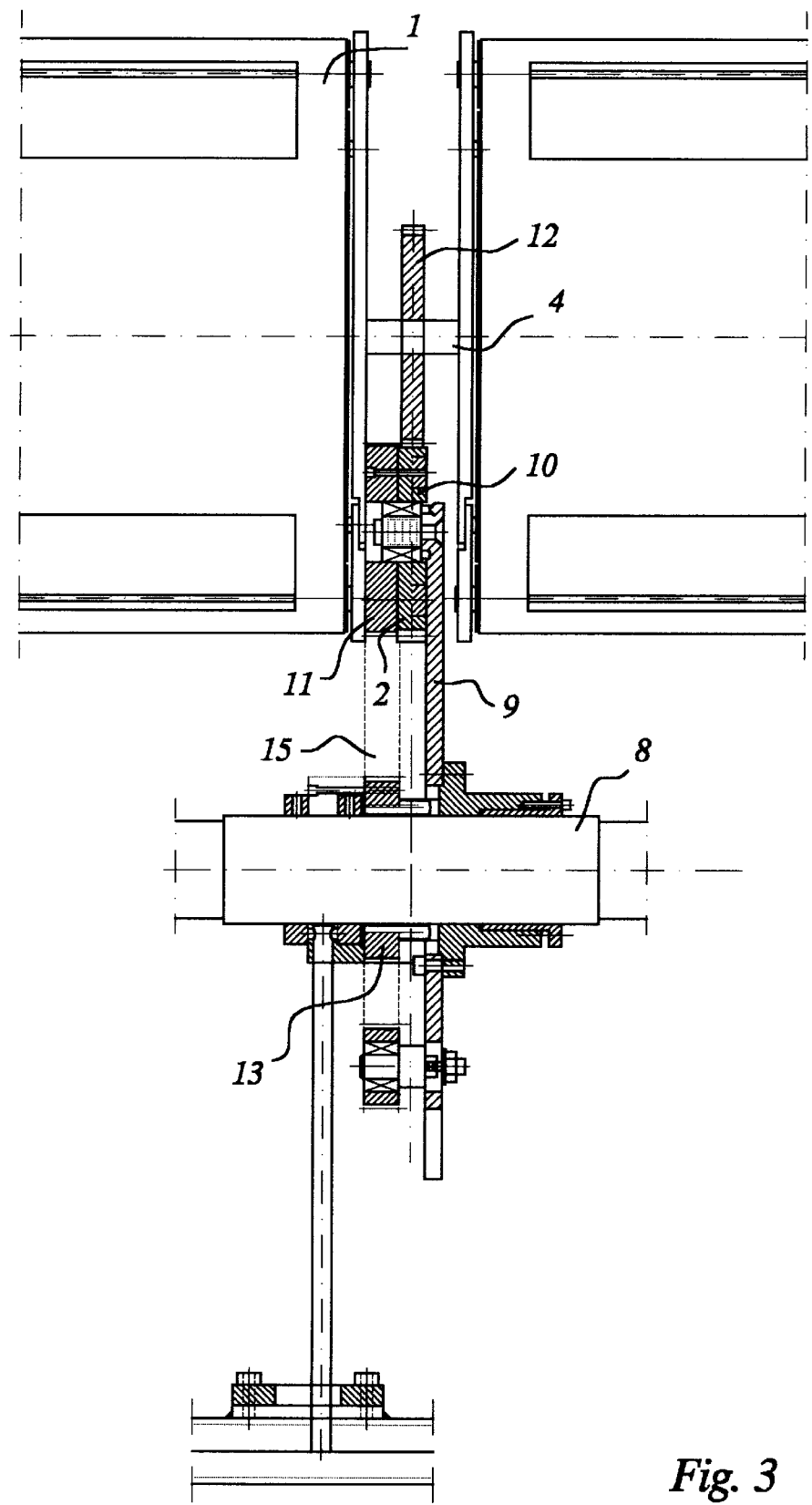
FIG. 3 is a cross-section along the line A—A shown in the FIG. 2.

Every sprocket 10 is linked to a sprocket 11, mounted coaxially with the same (see FIG. 3). The shaft 8 also carries a free-wheeling sprocket 13 with an attached rod 14, whose end is linked to the frame of the machine.

The rod 14 blocks the sprocket 13, thus preventing the latter from being pulled-on in a rotating motion by the shaft 8.

A belt 15 timed on both sides is mounted on the sprocket 13, and the sprockets 11 and the transmission wheels 16 are arranged in an alternating manner between the sprockets 10.

In particular, the teeth on the outer side of the belt 15 engage the sprocket 13, while the teeth on the inner side engage the sprockets 11. The shaft 4 of each trolley 1 carries a keyed-on sprocket 12 which engages with the sprockets 10 mounted on the disc 9.

Figure 2:
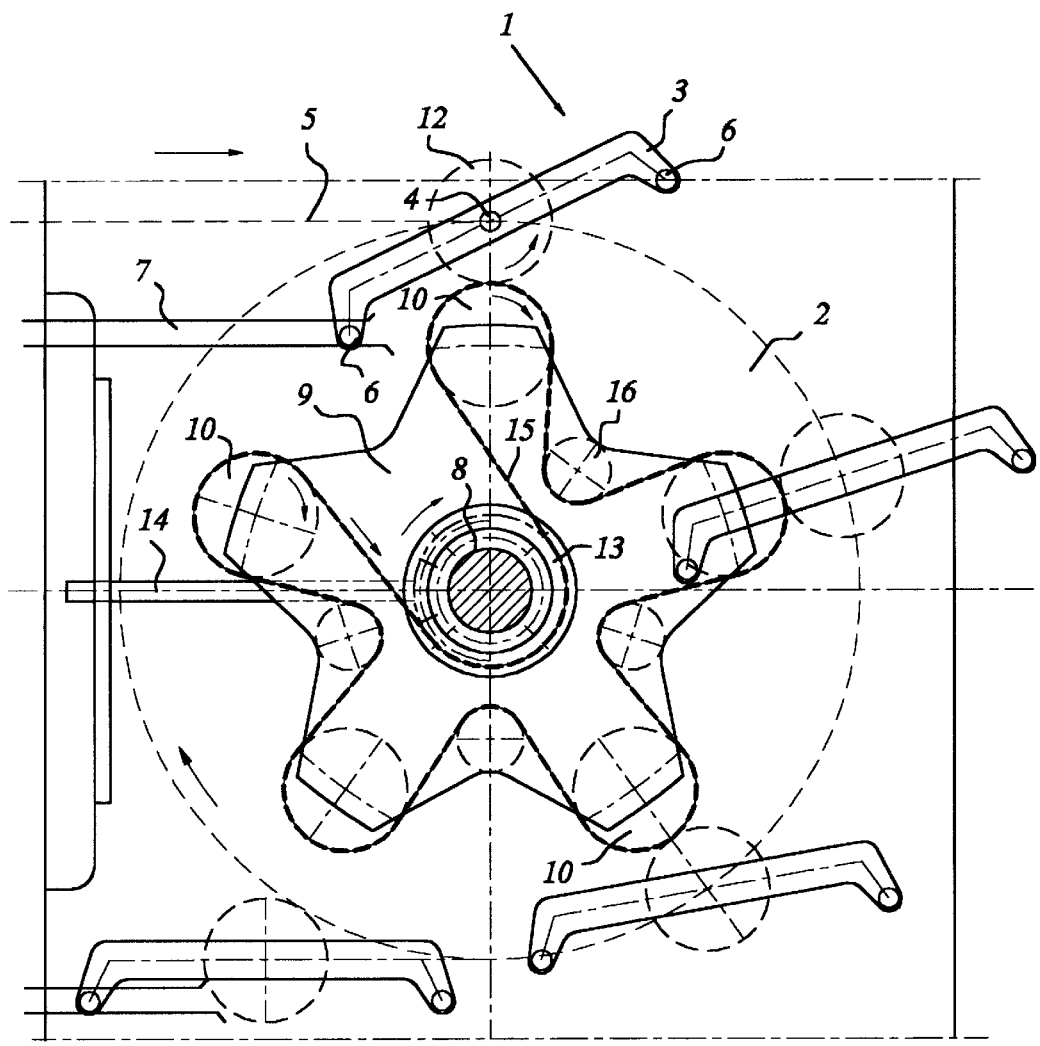
FIG. 2 is a schematic side view of the trolleys' counter-rotating devices facing one of the switching machine heads.

The operation of the machine described above is as follows:

The wheels 2 moving in the sense of the arrow F of the FIG. 2 pull the chains 5, which are firmly fastened by anchoring clamps not shown in the figure, to the shafts 4 of the trolleys 1.

In the straight sections of the path the trolleys maintain the desired angular position thanks to the engagement of the free-wheeling rollers 6 sliding along the fixed guides 7.

When the anchor clamps of the shafts 4 at the ends of the machine head come into contact with the pulling wheels 2, the free-wheeling rollers leave the guides 7, and the sprocket 12 keyed on the shaft 4 simultaneously engages the teeth of a corresponding sprocket 10 mounted on the disc 9.

The pitch between the sprockets 10 will obviously be the same as that between the trolleys. Moreover, the meshing of the sprockets 12 and 10 is aided by the fact that the latter are constantly turning, and that the sprockets 12 approach the sprockets 10 in a tangential fashion.

As a result of the rotation of disc 9, the belt 15 meshing with the fixed sprocket 13 starts the sprocket 10, as indicated by the arrows shown in FIG. 2.

The sprockets 10 are thus moving in the same direction of the wheel 2, and cause an equal but opposite rotation of the sprockets 12, which are firmly fastened to to axles 4 of the trolleys.

This makes it possible, by setting up the appropriate tooth ratios between the sprocket 16 and the sprockets 11, to cause each sprocket 12 to complete, while passing the trolley from the upper to the lower part of the path, an equal and opposite rotation to that of the drive wheel 2.

The trolleys will thus maintain a constant inclination even during the curved portions of their path.

The fact of providing a belt 15 capable of meshing with the fixed wheel 13 by its outer teeth allows mounting the belt in an outer position with respect to the shaft 8.

This has the considerable advantage of allowing a quick replacement of the belt, which can simply be slipped off the device and replaced without a need to disassemble the shaft to permit its passage.

This achieves a mechanism capable of imposing a counter-rotating motion on the trolleys of a switching machine. This motion allows to maintain them in a correct position while passing over the control wheels at the two ends of the machine. The mechanism is extremely simple and therefore inexpensive to produce, easy to install and demanding only a very minimum of maintenance.

A skilled man may apply numerous modifications and variations, all of them however falling within the scope of this invention.

We claim:

1. A switching machine comprising a number of trolleys, belts and at least two drive wheels set at ends of the machine and rotatably mounted about a shaft, said trolleys being pulled by said belts, said belts being mounted on said drive wheels, the machine further comprising a mechanism capable of imposing a counter rotation of the trolleys to keep them in a correct position while passing over the drive wheels, said mechanism comprising:

a number of first sprockets mounted on a support firmly attached to said drive wheels;

for each trolley, a keyed-on sprocket firmly attached to the trolley to mesh with the first sprockets when the trolley reaches the end of its path;

means for imposing on said first sprockets a rotation proportional to the rotation of said drive wheels and in the same direction of rotation, said means for imposing rotation on said first sprockets including a double-timed belt, a fixed sprocket, and pulleys firmly attached to said first sprockets, said double-timed belt being mounted on said pulleys and engaging said fixed sprocket mounted on the shaft of the drive wheels and support.

2. The switching machine according to claim 1, wherein said double-timed belt engages the pulleys firmly attached to the first sprockets with inner teeth, and the first fixed sprocket with outer teeth.

3. The switching machine according to claim 1, further comprising, interposed between the first sprockets, an equal number of transmission wheels.

\* \* \* \* \*